United States Patent [19]

Rademachers et al.

[11] 4,173,624
[45] Nov. 6, 1979

[54] RECOVERY OF SODIUM SULPHATE IN PRODUCTION OF IRON OXIDE BLACK PIGMENTS

[75] Inventors: Jakob Rademachers; Günter Linde, both of Krefeld, Fed. Rep. of Germany

[73] Assignee: Bayer Aktiengesellschaft, Leverkusen, Fed. Rep. of Germany

[21] Appl. No.: 882,679

[22] Filed: Mar. 2, 1978

Related U.S. Application Data

[63] Continuation of Ser. No. 781,280, Mar. 25, 1977, abandoned.

[30] Foreign Application Priority Data

Mar. 25, 1976 [DE] Fed. Rep. of Germany ....... 2712798

[51] Int. Cl.$^2$ ........................ C01D 5/00; C01G 49/02
[52] U.S. Cl. .................................... 423/551; 423/632
[58] Field of Search ............... 423/140, 142, 151, 152, 423/632, 551, DIG. 2

[56] References Cited

U.S. PATENT DOCUMENTS

| | | | |
|---|---|---|---|
| 2,631,085 | 3/1953 | Bennetch | 423/DIG. 2 |
| 3,706,531 | 12/1972 | Cozza et al. | 423/DIG. 2 |
| 3,970,738 | 7/1976 | Matsui et al. | 423/632 |

OTHER PUBLICATIONS

Kirk-Othmer, "Encyclopedia of Chemical Technology", Second Edition, vol. 18, (1969), pp. 502, 503.

Primary Examiner—Delbert E. Gantz
Assistant Examiner—Wayne A. Langel
Attorney, Agent, or Firm—Sprung, Felfe, Horn, Lynch & Kramer

[57] ABSTRACT

In the production of ferric oxide black pigments with the simultaneous recovery of sodium sulphate wherein ferrous sulphate is reacted with an alkaline sodium compound at a pH above about 6 and a temperature above about 50° C., and the pigment formed is separated from the mother liquor containing sodium sulphate, the improvement which comprises conducting the reaction at a sodium sulphate concentration of at least about 20% by weight, after separation of the pigment cooling at least part of the sodium sulphate-containing mother liquor to a temperature of at most about 30° C., thereby to crystallize sodium sulphate decahydrate, and separating the crystals. Air is preferably passed through the reaction solution to oxidize the precipitated pigment and, advantageously, make-up water is added to compensate for water carried off by the air. The end product mother liquor, containing an appreciable amount of sodium sulphate, is employed to dissolve ferrous sulphate for a subsequent cycle.

1 Claim, 3 Drawing Figures

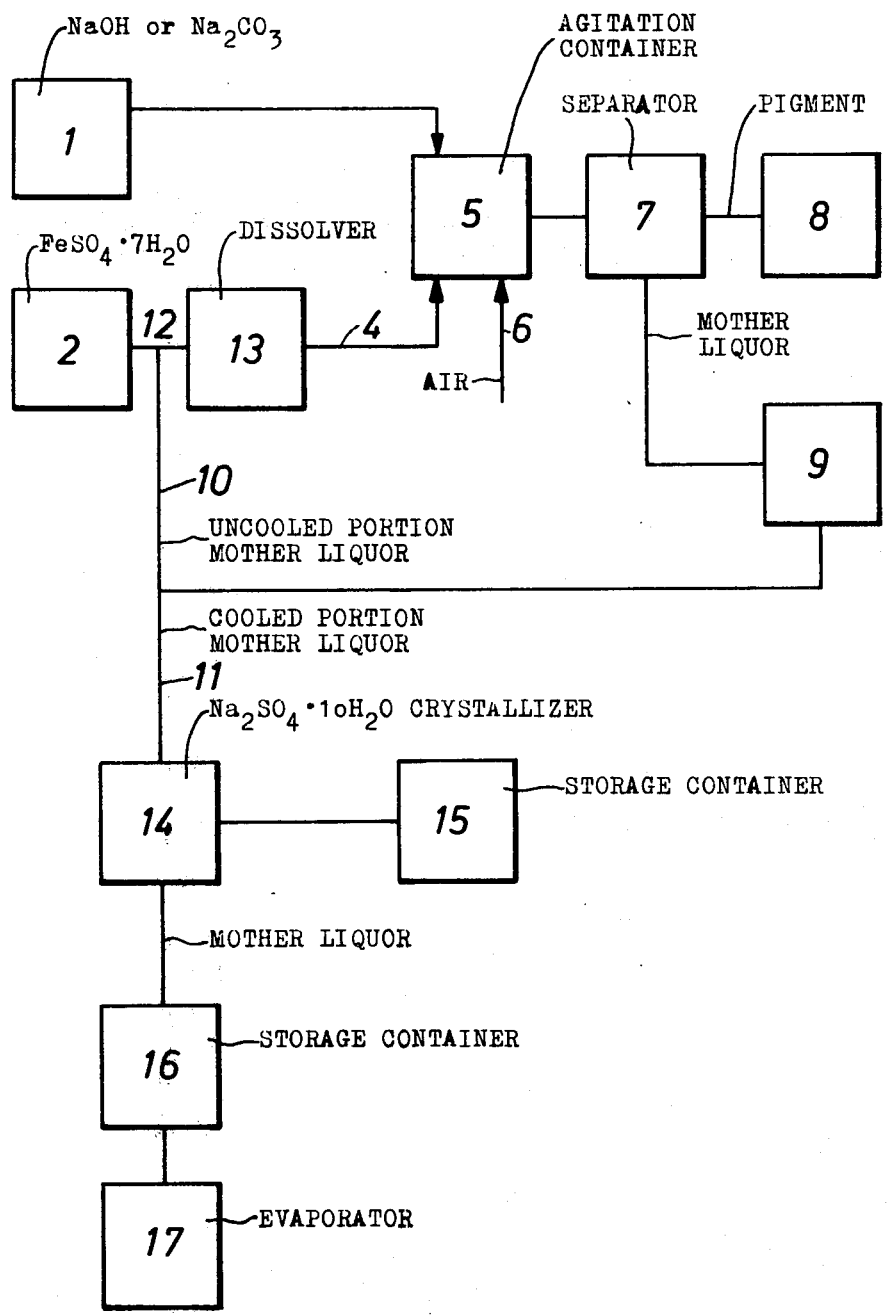

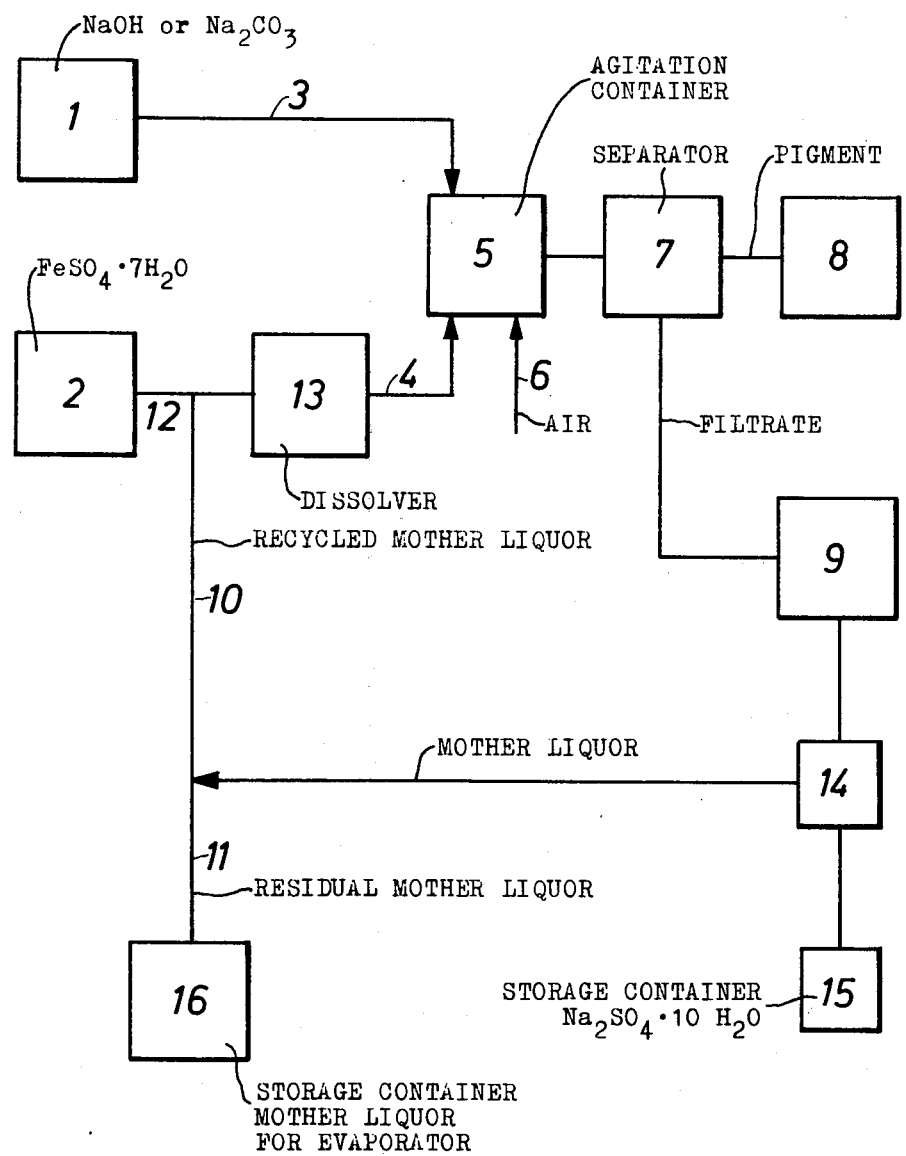

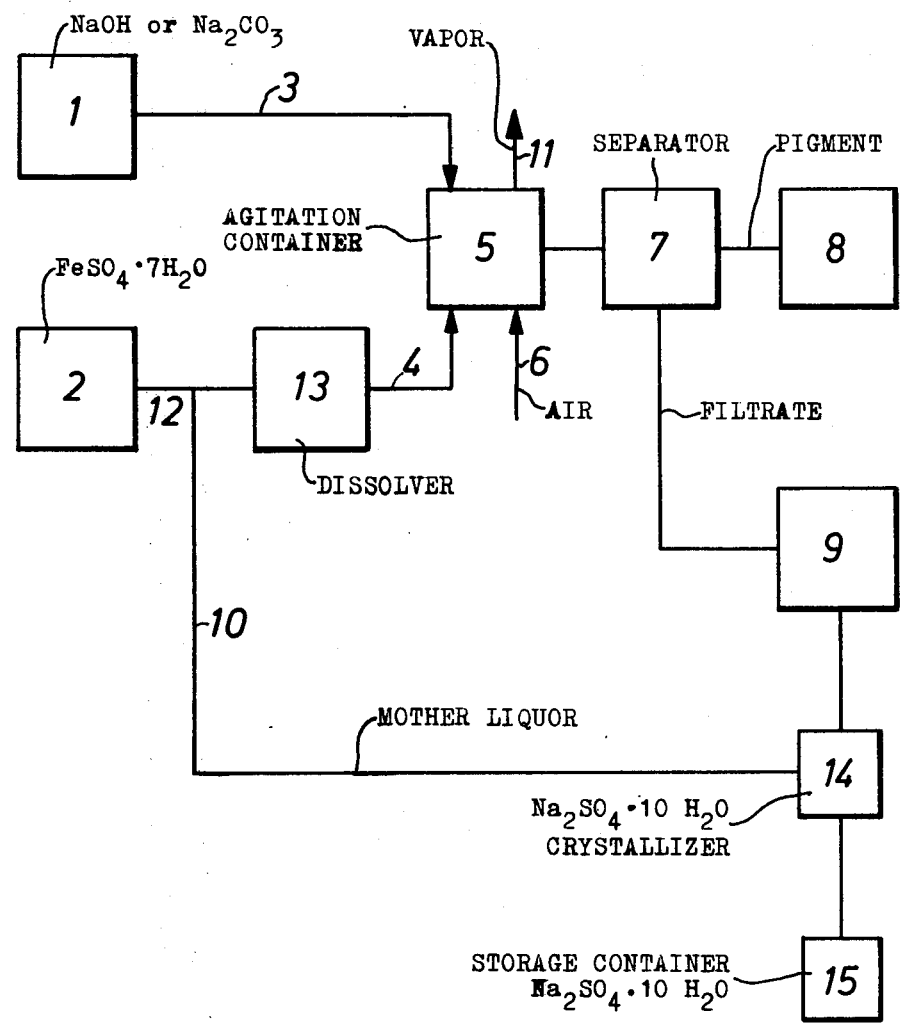

RECOVERY OF SODIUM SULPHATE IN PRODUCTION OF IRON OXIDE BLACK PIGMENTS

This is a continuation of application Ser. No. 781,280, filed Mar. 25, 1977, now abandoned.

Ferric oxide black pigments are produced by various methods, mainly by the so-called aniline process and by the precipitation method. In the aniline process nitrobenzene is reduced by metallic iron, the iron being oxidized to magnetite. The precipitation method starts from iron salts which are precipitated from aqueous solution by alkalis, generally solutions of caustic soda, to form iron hydroxide and are oxidized with air to form magnetite in one step. A variation of this process exists in the two step method in which firstly a part of the precipitated iron is oxidized to form goethite and subsequently reacted with the remaining precipitated ferric hydroxide to form black pigment.

Precipitation methods have also already been disclosed in which the ferrous sulfate heptahydrate from pickling plants or occurring in titanium manufacture as a by-product is used as an iron supplying component. In ferric oxide black pigment production from scrap iron by the aniline process there is produced in addition to the pigment a further high value product, namely aniline. In the known precipitation method, in addition to the pigment there is further produced sodium sulfate dissolved in water in highly dilute form, which can bring waste water problems. This sodium sulfate produced according to the following equation (I):

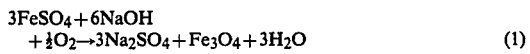
$$3FeSO_4 + 6NaOH + \tfrac{1}{2}O_2 \rightarrow 3Na_2SO_4 + Fe_3O_4 + 3H_2O \tag{1}$$

A possibility of obtaining sodium sulfate from these solutions consists in the evaporation of the mother liquors, which occur in pigment production. Such a process is described in German Offenlegungsschrift No. 2,112,271. Since the precipitation reactions are usually conducted at temperatures over 60° C. to approximately 90° C., such a process is relatively energy intensive and the isolation of pure sodium sulfate is only possible to a limited extent.

The object of the present invention is in the most economical way possible to obtain sodium sulphate in the highest possible degree of purity from the mother liquors of the pigment production process.

It has now surprisingly been found that with an increase of the salt concentration during the pigment production process, the pigment properties are maintained, if, in the case of black pigment production, work is done in the range of about pH 7 to 10.

The present invention therefore provides a process for the production of ferric oxide black pigments with the simultaneous recovery of sodium sulphate by reacting ferrous sulphate wth sodium compounds at pH values above about 6 and temperatures above about 50° C., the pigment formed being separated from the mother liquor containing sodium sulphate, characterized in that the reaction is carried out at sodium sulphate concentrations of at least about 20% by weight, preferably from about 25% to 30% by weight and after the separation of the pigment, the mother liquor containing sodium sulphate is wholly or partially cooled to temperatures of at most about 30° C. preferably at most about 25° C. and in so doing crystallized sodium sulphate decahydrate is separated.

The required sodium sulphate concentrations are obtained by recirculating the mother liquors containing sodium sulphate for dissolving ferrous sulphate for the reaction and/or by evaporation during pigment formation and/or by corresponding adjustment of the concentration of the starting solutions.

The process according to the invention permits pigment production at substantially higher salt contents than are normally present in the case of the precipitation method, without the pigment properties suffering. Thus, whereas the sodium sulphate concentration is normally approximately 150 grams $Na_2SO_4$ per liter, in the process according to the invention the concentration is at least about 200 grams per liter, preferably about 250 to 400 grams per liter. Upon cooling of the mother liquor containing sodium sulphate which is obtained after the pigment separation to approximately 25° C. the mother liquors separated from sodium sulphate crystals only contain approximately 250 grams sodium sulphate per liter and at cooling to a temperature of 20° C. approximately 175 grams sodium sulphate per liter. The cooling cycle is advantageously in conjunction with a vacuum cooling.

The separated crystals comprise sodium sulfate decahydrate and they contain practically no impurities. The iron content is under about 0.005% by weight. Such a sodium sulphate decahydrate can, for example, be reused in the glass or washing agent industry.

Various embodiments of the process according to the invention are described below by way of example with reference to the accompanying drawings wherein FIGS. 1, 2 and 3 are flow sheets of different process embodiments.

Referring now more particularly to FIG. 1, the reference numerals 1 and 2 represent storage containers for sodium hydroxide or carbonate solution, preferably 20 to 40% by weight, and ferrous sulphate heptahydrate. Caustic soda and ferrous sulphate solution are supplied via pipes 3 and 4 to an agitation container 5. The pigment formation takes place in the agitation container 5. For this purpose air is introduced in finely distributed form via a pipe 6. The temperature is adjusted to a range of approximately 50° C. to 100° C., preferably 65° to 85° C., the pH value is adjusted to values of from approximately 7 to 10, preferably 7 to 9. The vapor quantity carried out with the air is compensated by the addition of water (not shown). The sodium sulphate concentration during the pigment formation is between 20 and 30% by weight, preferably 25 to 30% by weight. The ferrous sulphate solution introduced into the agitation container 5 has a concentration of approximately 10% to 20% by weight. Subsequent to the pigment formation there takes place in vessel 7 the separation of pigment which is transferred to vessel 8 while the mother liquor containing sodium sulphate is transferred to vessel 9. The separated pigment can be converted into the finished $Fe_3O_4$ pigment in known manner optionally after washing and drying at temperatures of approximately 50° C. to 120° C. (not shown). The mother liquor containing sodium sulphate in concentrations of approximately 25 to 30% by weight is divided into two part flows 10 and 11 roughly in the ratio 1.5 to 2.0:1, preferably 1.75:1. The practically uncooled part flow 10 containing sodium sulphate is used to dissolve the ferrous sulphate quantity necessary for the pigment formation. For this purpose there is added to the part flow the storage container 2 the necessary quantity of ferrous sulphate via a pipe 12. After the ferrous sulphate has been dissolved in an intermediate container 13, the ferrous sulphate sodium passes as already described to the pigment formation. The part flow 11 is cooled to temperatures of at least 30° C., preferably to at least 25° C. in 14. The sodium sulphate decahydrate crystallized out in 14 can after filtration and optional subsequent drying be transferred into a storage container 15. The filtrate 16 impoverished in sodium sulphate can subsequently be evaporated in 17 either partially or wholly.

According to the embodiment of the process according to the invention illustrated in FIG. 2 the mother liquor containing sodium sulphate occurring in 9 is cooled in 14 to temperatures of at most 30° C., preferably at most 25° C. Sodium sulphate which crystallizes out in this process can after separation, for example by filtration, be transferred to 15. The mother liquor thereafter impoverished in sodium sulphate can again be divided into two part flows 10 and 11 in the ratio of approximately 3 to 5:1, preferably 4:1. The part flow 10 again serves to dissolve ferrous sulphate in the manner already described in FIG. 1, while the part flow 11 can be transferred into the container 16 and wholly or partially evaporated obtaining further solid sodium sulphate decahydrate (not shown).

According to the embodiment shown in FIG. 3 the filtrate 9 containing sodium sulphate which is obtained after the filtration of the pigment in 7 is cooled in 14 to temperatures of at most 30° C., preferably to at most 25° C. The mother liquor impoverished in sodium sulphate is used via the pipe 10 in the manner already described to dissolve the quantity of ferrous sulphate necessary for the pigment formation. The sodium sulphate decahydrate obtained after filtration, which can optionally be further dried, occurs at 15.

In a further variation of an embodiment of the process according to the invention illustrated in FIG. 3 a partial evaporation is provoked during the pigment production in 5 by the quantity of air introduced for oxidation. In this arrangement a part (of the water present approximately 5% to 15% by weight) escapes via the pipe 11. The evaporation is conducted until a sodium sulphate concentration in the pigment formation of approximately 20% to 30% by weight, preferably about 23% to 27% by weight is attained in the container 5. However also according to this variant of the process according to the invention after the separation of the sodium sulphate decahydrate at 14, the quantity of mother liquor necessary for the dissolving of fresh ferrous sulphate should still be present. In this last described variant of the process according to the invention approximately 90% by weight of the sodium sulphate formed in the pigment formation is brought to crystallization by cooling the filtrate at 14.

The process according to the invention can be considered both for continuous and discontinuous production of ferric oxide black pigments. It is equally suitable for the known one step and for the known two step precipitation process. The process according to the invention is illustrated in the following examples:

EXAMPLE 1

(Corresponding to the embodiment shown in FIG. 1)

375 Parts by weight of solution containing 115 parts by weight sodium hydroxide were supplied from 1 via the pipe 3 to the container 5 in which the pigment formation takes place. 1000 parts by weight of filtrate, containing 390 grams of sodium sulfate per liter, were mixed via the pipe 10 with 400 parts by weight of ferrous sulfate heptahydrate (92%), which contain 200 parts by weight of $FeSO_4$. This produced 1400 parts by weight of $FeSO_4$ solution with 200 parts by weight of $FeSO_4$ and 300 parts by weight of sodium sulfate. The agitation container 5 was ventilated with air at 70° C. The quantity of water vapor carried out with the air was compensated by the addition of water. The pH value which tended to fall as the reaction proceeded was kept constant at pH values of approximately 8.5 to 9 by the addition of further caustic soda. The reaction was terminated after 7 hours, being recognizable by a weight ratio of FeO to $Fe_2O_3$ of approximately 1:1.8. After the reaction had terminated there were present 1775 parts by weight of suspension with 100 parts by weight of $Fe_3O_4$ and 500 parts by weight of sodium sulfate. The space/time yield was 11 grams $Fe_3O_4$ per liter per hour. The ferric oxide sediment formed was filtered at 7, washed and dried at 8. The pigment obtained had the same qualities in color, shade and intensity as a pigment obtained without filtrate recirculation. The filtrate, which had a temperature of approximately 40° C., with 390 grams of sodium sulfate per liter (1575 parts by weight of filtrate with 470 parts by weight of sodium sulfate) was partially (1000 parts by weight of filtrate) re-used to dissolve new ferrous sulfate. The rest of the filtrate passed via 11 to 14, where the cooling to 25° C. and separation of the crystallized sodium sulfate decahydrate took place. The mother liquor with 250 grams of sodium sulfate per liter, which was obtained after separation of the crystallized Glauber's salt, was finally evaporated.

EXAMPLE 2

(Corresponding to the embodiment illustrated in FIG. 2)

400 Parts by weight ferrous sulphate heptahydrate (92%) containing 200 parts by weight ferrous sulfate from storage container 2 is introduced into the intermediate container 13 together with 950 parts by weight filtrate (25° C.) which contained 22 parts by weight sodium sulfate to form 1350 parts by weight solution containing 200 parts by weight ferrous sulfate and 207 parts by weight sodium sulfate. The solution of intermediate container 13 was introduced into the agitation container 5 by addition of 350 parts by weight sodium hydroxide solution containing 150 parts by weight sodium hydroxide from storage container 1. Subsequent to the pigment formation in the container 5, which was carried out at a pH value of approximately 7 to 7.5 and which lasted approximately 4.5 hours, there were present 1700 parts by weight of suspension containing 100 parts by weight $Fe_3O_4$ and 405 parts by weight of sodium sulfate. The space-time yield was 18 grams $Fe_3O_4$ per liter per hour. After filtration in 7, 1500 parts by weight of filtrate containing 380 parts by weight of sodium sulfate were obtained in 9. In 14 the filtrate containing sodium sulfate was cooled to 25° C. and brought to crystallization. The majority of the mother liquor (950 parts by weight containing 207 parts by weight sodium sulfate) passed via 10 to the dissolving of ferrous sulfate, while the rest (250 parts by weight of the mother liquor containing 55 parts by weight sodium sulfate) was evaporated.

EXAMPLE 3

(Corresponding to the embodiment illustrated in FIG. 3)

The conditions remained as in Example 2 with the exception that in the oxidation reaction the water evaporation was not completely compensated by the addition of new water. As a result the sodium sulphate concentration in the filtrate increased to 360 grams per liter. The oxidation reaction was terminated after 5.5 hours. The hourly space-time yield was 15 grams $Fe_3O_4$ per liter. The pigment quality corresponded to that of the product of Example 2.

In the foregoing examples all parts are by weight unless otherwise expressed.

It will be appreciated that the instant specification and examples are set forth by way of illustration and not limitation, and that various modifications and changes may be made without departing from the spirit and scope of the present invention.

What is claimed is:

1. In the production of iron oxide black pigments with the simultaneous recovery of sodium sulphate wherein ferrous sulphate is reacted with an alkaline sodium compound at a pH from about 7 to 10 and a temperature above about 50° C., and the pigment formed is separated from the mother liquor containing sodium sulphate, the improvement which comprises conducting the reaction in sodium sulphate at a concentration of at least about 20% by weight, after separation of the pigment cooling at least part of the sodium sulphate-containing mother liquor to a temperature of at most about 30° C., thereby to crystallize sodium sulphate decahydrate, separating the crystals, and recirculating the mother liquor containing sodium sulphate to dissolve additional ferrous sulphate for further reaction.

* * * * *